United States Patent
Cedeno

(10) Patent No.: US 8,917,580 B2
(45) Date of Patent: Dec. 23, 2014

(54) INSTRUCTIONAL TIME AND TIME MANAGEMENT APPARATUS, METHOD AND COMPUTER PROGRAM PRODUCT

(75) Inventor: Jesus Cedeno, Weston, FL (US)

(73) Assignee: Golearn Toys, LLC, Weston, FL (US)

( * ) Notice: Subject to any disclaimer, the term of this patent is extended or adjusted under 35 U.S.C. 154(b) by 582 days.

(21) Appl. No.: 12/821,195

(22) Filed: Jun. 23, 2010

(65) Prior Publication Data

US 2010/0322040 A1 Dec. 23, 2010

Related U.S. Application Data

(60) Provisional application No. 61/219,720, filed on Jun. 23, 2009.

(51) Int. Cl.
*G04C 17/00* (2006.01)
*G04B 37/00* (2006.01)
*G06Q 10/10* (2012.01)

(52) U.S. Cl.
CPC .................................. *G06Q 10/109* (2013.01)
USPC ........................... 368/242; 368/250; 368/316

(58) Field of Classification Search
USPC ............. 368/223, 244, 82–84, 239, 241–243, 368/277, 316–317
See application file for complete search history.

(56) References Cited

U.S. PATENT DOCUMENTS

| | | | |
|---|---|---|---|
| 3,911,668 A | 10/1975 | Beguin | |
| 4,175,378 A | 11/1979 | Shelton | |
| 4,368,988 A * | 1/1983 | Tahara et al. | 368/63 |
| 5,199,009 A | 3/1993 | Svast | |
| 6,416,216 B1 * | 7/2002 | Haughey | 368/89 |
| 6,449,219 B1 * | 9/2002 | Hepp et al. | 368/16 |
| 6,477,117 B1 * | 11/2002 | Narayanaswami et al. | 368/251 |
| 6,525,997 B1 * | 2/2003 | Narayanaswami et al. | 368/223 |
| 6,966,779 B1 * | 11/2005 | Bachelor | 434/304 |
| 7,426,157 B2 * | 9/2008 | Arnold et al. | 368/82 |
| 7,515,509 B2 | 4/2009 | Klein | |
| 7,924,657 B2 * | 4/2011 | Liebowitz | 368/327 |
| 8,139,444 B2 * | 3/2012 | Schnabel | 368/76 |
| 2005/0146990 A1 * | 7/2005 | Mayer | 368/95 |
| 2007/0127317 A1 | 6/2007 | Chattle | |
| 2007/0147182 A1 * | 6/2007 | Witchey et al. | 368/223 |

FOREIGN PATENT DOCUMENTS

GB 2433793 A 7/2007

* cited by examiner

*Primary Examiner* — Sean Kayes
(74) *Attorney, Agent, or Firm* — Kegler Brown Hill & Ritter; James J. Pingor

(57) ABSTRACT

Apparatus, methods and computer program products for time and time management instruction are provided. In one embodiment, an apparatus includes: a time instruction module; an indicia of time controlled by the time instruction module; and an input/output mechanism configured to provide a display related to time or time management.

12 Claims, 15 Drawing Sheets

INSTRUCTIONAL TIME AND TIME MANAGEMENT APPARATUS, METHOD AND COMPUTER PROGRAM PRODUCT

CROSS-REFERENCE TO RELATED APPLICATIONS

This application claims the benefit of U.S. Provisional Patent application Ser. No. 61/219,720 entitled "INSTRUCTIONAL TIME AND TIME MANAGEMENT APPARATUS, METHOD AND COMPUTER PROGRAM PRODUCT" and filed Jun. 23, 2009. The entirety of the above-noted application is incorporated by reference herein.

TECHNICAL FIELD

The subject innovation relates generally to time and, more specifically, to apparatus, methods and computer program products that enable instruction related to and management of time and events related thereto.

BACKGROUND

Time management is often associated with a completion of tasks or goals. Oftentimes, tasks are compiled in a simple task list. For individual tasks, an importance rating is sometimes established, deadlines set, and priorities assigned. This prioritization process results in a schedule or calendar of activities. Today, many people manage time in an "old school" pen and paper technique while others employ 'high-tech' solutions such as laptops, smartphones, personal digital assistants (PDAs), among others.

Essentially, 'time management' refers to a range of skills, tools, and techniques used to manage time when accomplishing specific tasks, projects and goals. Conventionally, a time management system is a specifically designed combination of processes, tools and techniques—each of which vary from application to application.

In today's society, children have more and more responsibilities such as homework, sports, chores, etc. Additionally, routines such as meal times, nap times and bedtimes have become an essential element in parenting. In addition to the children's schedule, parents too have many of their own tasks to monitor and track. Thus, in order to maintain a stress-free environment, it is extremely helpful to promote time management skills. Thus, it is helpful if the children are taught time management skills at an early age so as to contribute to monitoring and completing tasks and events on time.

Unfortunately, personal calendars, whether paper or computer-based, can only provide a means for tracking. Thus, there is a need to promote early childhood growth and development in both time instruction as well as time management skills.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system (and method) that facilitates time instruction and management. The system includes a time instruction component that receives a number of event indicators. Each of the event indicators is associated with a time of day. An indicia of time component is included that employs a single hand dial that identifies the time in relation to a graphical representation of at least one of the plurality of event indicators associated to the time.

In other aspects, the system can also include a programming interface component that facilitates input and identification of the plurality of event indicators. A personal information input component that facilitates input of personal information that is rendered upon trigger by a user or upon the time can be included. The personal information is one of a name or personal message. In other aspects, the system can also include an event input component that receives each of the plurality of event indicators from a user.

The system can also include an instructional interface component that facilitates selection of a subset of the event indicators and association of each of the subset to an associated time. An event selection component that presents each of the plurality of event indicators for selection can be provided.

Still further, the system can include a personal information input component that facilitates input of personal information. The personal information is rendered upon trigger of a user or upon the time. An event monitoring component can be used to track each of the subset of the plurality of event indicators in relation to the time. An event determination component can compare the time to each of the subset of the plurality of event indicators and identify an event that corresponds to the time. A rendering component can display a single dial that identifies a current time in relation to the event that corresponds to the current time.

In still other aspects, the innovation is an apparatus configured to facilitate time instruction and management functions. The apparatus can include a time instruction module, indicia of time controlled by the time instruction module, and an input/output mechanism configured to provide a rendering related to a current time in relation to the one or more event identifiers. The indicia of time rotates about a clock-like face having one or more event identifiers. The indicia of time can be one of a sole hand dial or an illuminated region that depicts a sole hand dial. Further, the time instruction or management function is at least one of the following: causing movement of the indicia of time; providing audio regarding time or time management; or recording audio provided from a source external to the apparatus, among others. In doing so, one or more appliqués removably can be disposed on the clock-like face. The one or more appliqués can include alphanumeric or pictorial images indicative of time, time management or tasks performable by a user of the apparatus.

In yet another aspect thereof, a machine learning and reasoning (MLR) component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
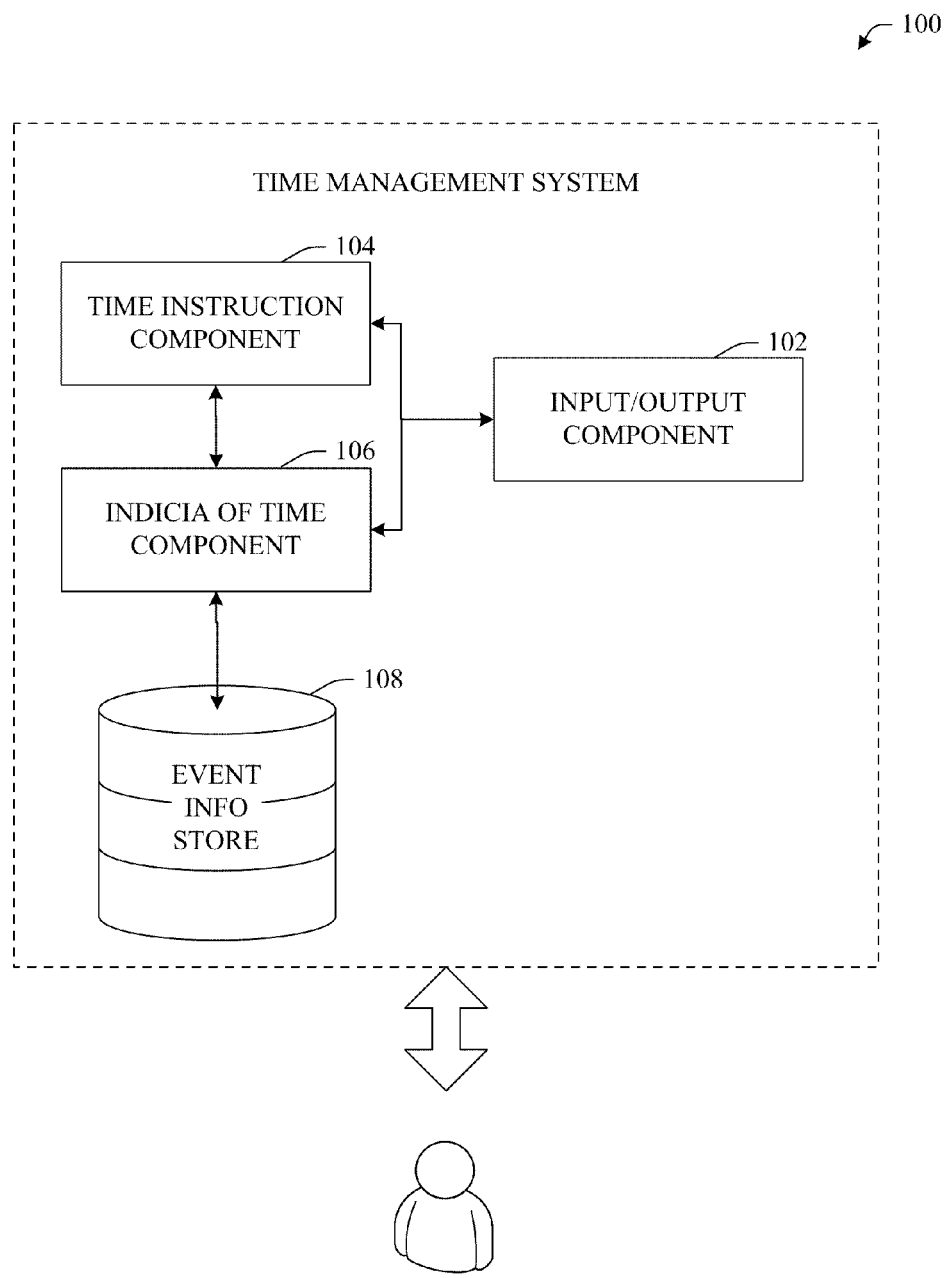
FIG. 1 illustrates an example time management system in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to an apparatus and/or computer-related entity, either hardware, a combination of hardware and software, software, or software in execution. For example, a component can be, but is not limited to being, a process running on a processor, a processor, an object, an executable, a thread of execution, a program, and/or a computer. As well, the component can be, include, or be embodied within, an apparatus or device. By way of illustration, both an application running on a server and the server can be a component. One or more components can reside within a process and/or thread of execution, and a component can be localized on one computer and/or distributed between two or more computers.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It will be understood that the innovation, as described and claimed herein, can be wholly- or partially-embodied within computer-executable instructions carried out by a processor or other electronic device. Additionally, it will be understood that the innovation can include or otherwise describe an apparatus or device that effects time instruction and management. In other words, the innovation is not intended to be limited to either a computer-based product or a hardware-based product. Rather, the innovation as described and claimed herein is directed to an instructional time and time management apparatus, method and computer program product, each of which can include hardware or software by design.

Referring initially to the drawings, FIG. 1 illustrates an example time management system 100 in accordance with aspects of the innovation. As illustrated, the time management system 100 can include an input/output component 102, a time instruction component 104 and indicia of time component 106. Additionally, the time management system 100 can include an event info (or information) store component 108. In operation, system 100 can be employed to teach children (and other individuals) the concept of time and time management. This education can be effected before, during and/or after learning how to read time on a 'regular' (e.g., two handed) or digital clock or watch. However, the innovation can also be used by anyone to promote an understanding of time and time management.

The input/output component 102 can include most any human-machine interface including, but not limited to, a microphone, monitor, touchscreen, camera or the like. Additionally, the input/output component 102 can include devices such as digital clocks, analog timing mechanisms with traditional 'hands,' among others. To this end, it will be appreciated that the indicia of time component 106 can be incorporated within the input/output component 102 in some aspects.

In addition to clock 'hands,' dials and digital numbers, the indicia of time component 106 can include computer generated renditions together with tangible (as well as computer generated) graphical representations of events, times of day, tasks, chores, or the like. The indicia of time component 106 will be better understood upon a review of the figures that follow.

The time instruction component 104 can, in conjunction with the input/output component 102, enable program and use of the time management system 100. As will be described in greater detail infra, the acts of programming and use of the time management system 100 will be better understood upon a review of the figures that follow. For instance, a parent can program a number of tasks from which a child can select. These tasks can be categorized, linked to specific times and maintained within event info store 108 as shown.

Figure 2:
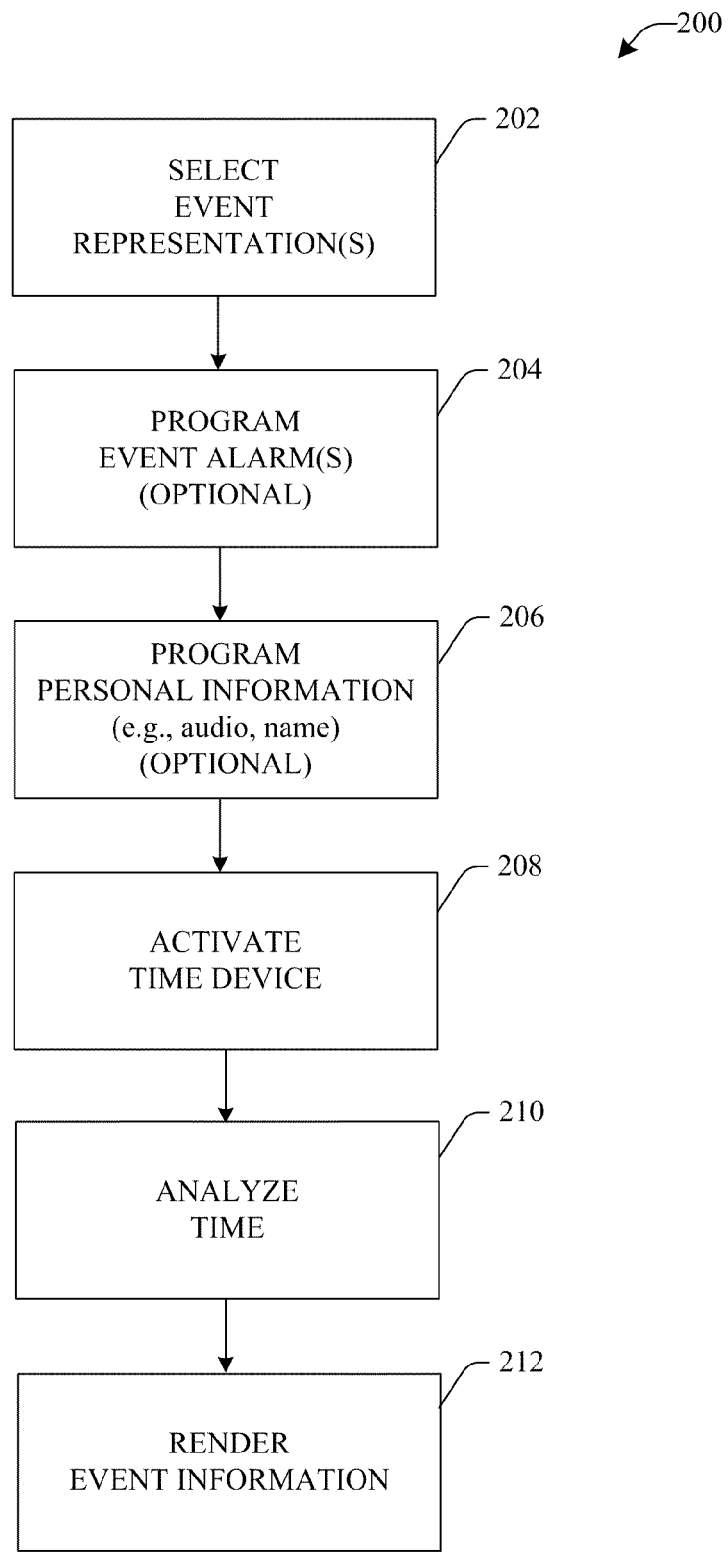
FIG. 2 illustrates an example flow chart of procedures that facilitate time instruction and management in accordance with an aspect of the innovation.

FIG. 2 illustrates a methodology 200 of time instruction and management in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, event representations can be selected. For example, a parent can select or designate event representations on behalf of a child. In another aspect, the parent can provide a pool of events from which a child can select in order to personalize their experience. Still further, a child can select their own event representations as desired or, as stated above, from a pre-designated set provided by a parent or otherwise. As will be understood, the event representations can be tangible representations (e.g., stickers, magnets, hand drawn, etc.). Additionally, the representations can be graphical representations rendered, for example, upon a monitor or screen.

At 204, event alarms can be programmed if desired. For example, an event alarm can be set to designate nap time, chore time, homework time, bedtime, etc. It will be understood that the alarms can be pre-programmed or custom made from music, audio, video, etc.

Similarly, a user's personal information or message can be programmed at 206. For example, a user's name can be selected from a set of pre-programmed names. In other aspects, a voice can be recorded which designates a name or other personal message. For instance, a parent can record messages for each (or a subset) of the events such that, when an event is due, the message or alert is rendered.

At 208, the time device is activated, e.g., started. As will be understood upon a review of the device figures that follow, a clock face can be used that employs a single indicia (e.g., hand) that rotates upon 24 separate marks, each designating an hour in a 24 hour day. Other aspects can employ 12 marks around the face of the clock such that a single hand rotates twice during a 24 hour day. In this aspect, events can be specified for that am or pm hour in either a tangible or computer-generated manner.

The time is analyzed at 210. For example, a particular time of day is analyzed and compared to the designated events. In accordance therewith, at 212, event information can be rendered, for example, an event can be lighted, flashed or an alarm (notification) can be rendered to designate a particular event. Thus, a user will be able to correlate the current time (e.g., via the single hand indicia) to the event(s). It will be understood that this methodology can promote time instruction and/or management.

Figure 3:
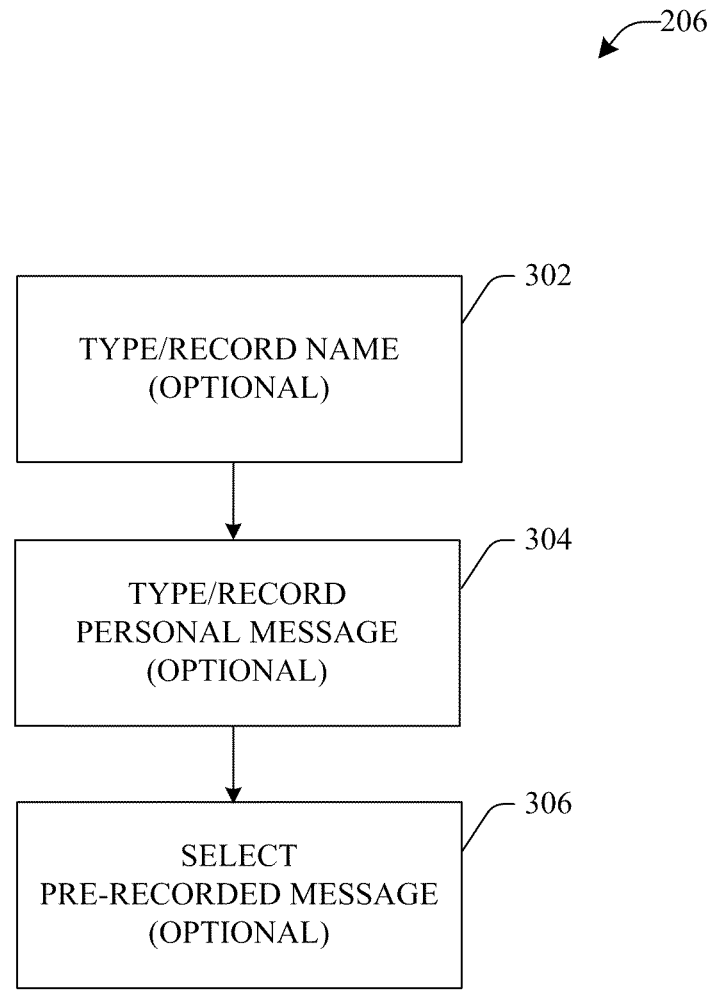
FIG. 3 illustrates an example flow chart of procedures that facilitate input of personal information in accordance with an aspect of the innovation.

FIG. 3 illustrates a methodology of the example act 206 of recording personal information. For example, at 302, a child's name can be typed or optionally recorded, for example, in their own voice. At 304, a personal message can be recorded, e.g., "Ava, it's nap time." Still further, at 306, a message can be selected from a set of pre-recorded messages, e.g., "It is dinner time."

Figure 4:
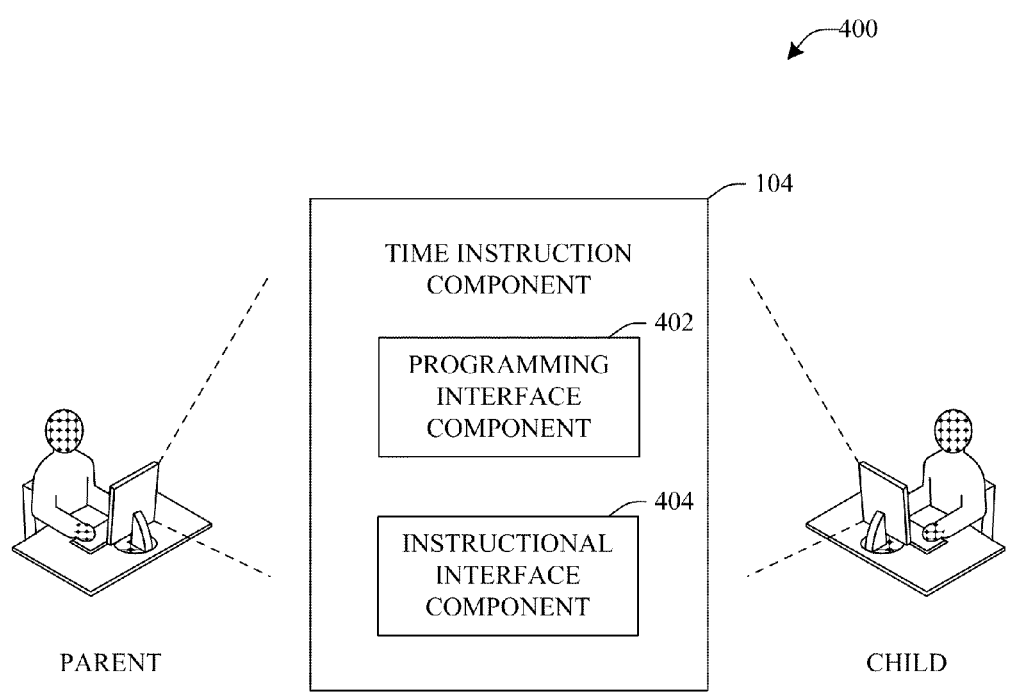
FIG. 4 illustrates an example time instruction component in accordance with an aspect of the innovation.

Referring now to FIG. 4, a block diagram of an example time instruction component 104 in accordance with aspects of the innovation is shown. In this example, the time instruction component 104 can include a programming interface component 402 and an instructional interface component 404. As will be seen in the figures that follow, the programming interface component 402 can effectively be used to set up the time instructional and management system (or device). The instructional interface component 404 can be used, for example, by a child to associate time to events, thereby facilitating time instruction and management.

Figure 5:
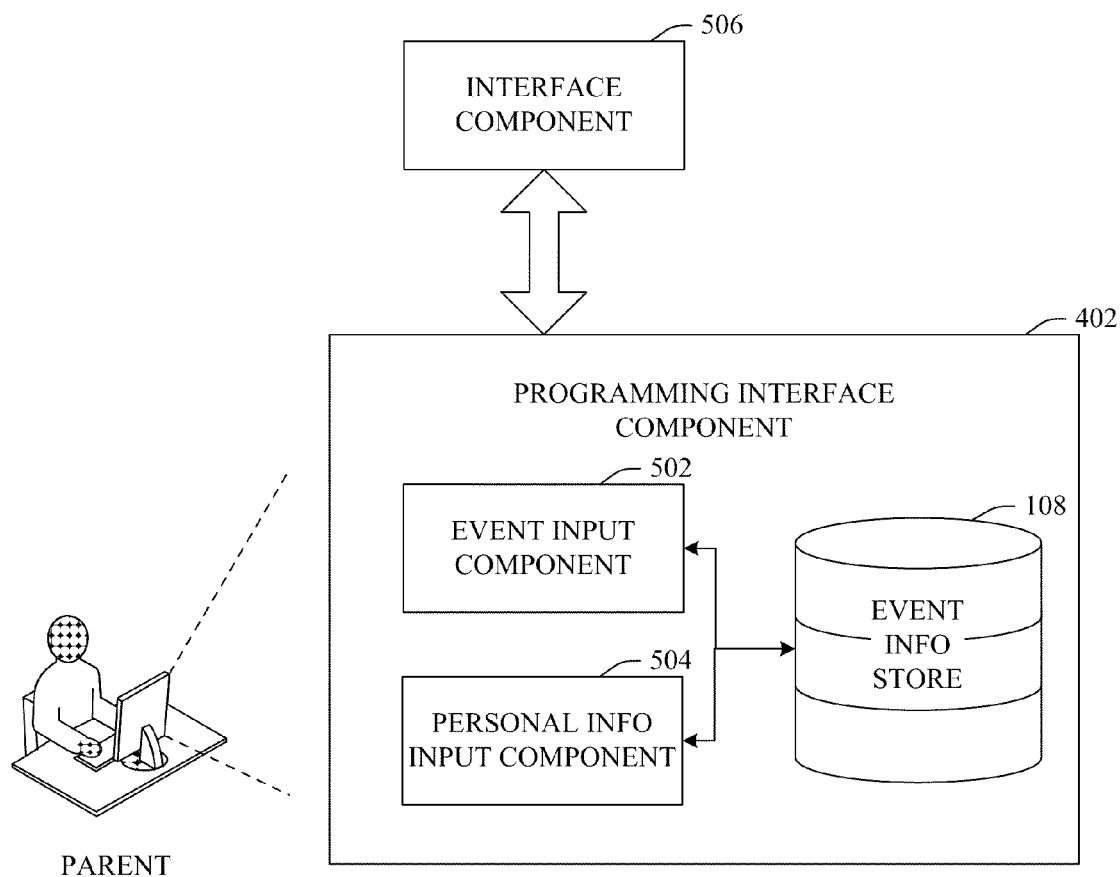
FIG. 5 illustrates an example programming interface component in accordance with an aspect of the innovation.

FIG. 5 illustrates an example programming interface component 402 in accordance with aspects of the innovation. Here, the programming interface component 402 can include an event input component 502 and a personal information input component 504. The inputted information can be stored within the event information store 108.

In operation, in this example, a parent can employ the event input component 502 to input an event or set of events for later selection by a child. Similarly, the personal information input component 504 can be employed to enter personal information (e.g., names, messages, etc.). The information can be entered via an interface component 506 such as a microphone, camera, video camera, touch screen, keyboard, or the like. The information can be stored within the event information store 108 for use in time instruction and management.

Figure 6:
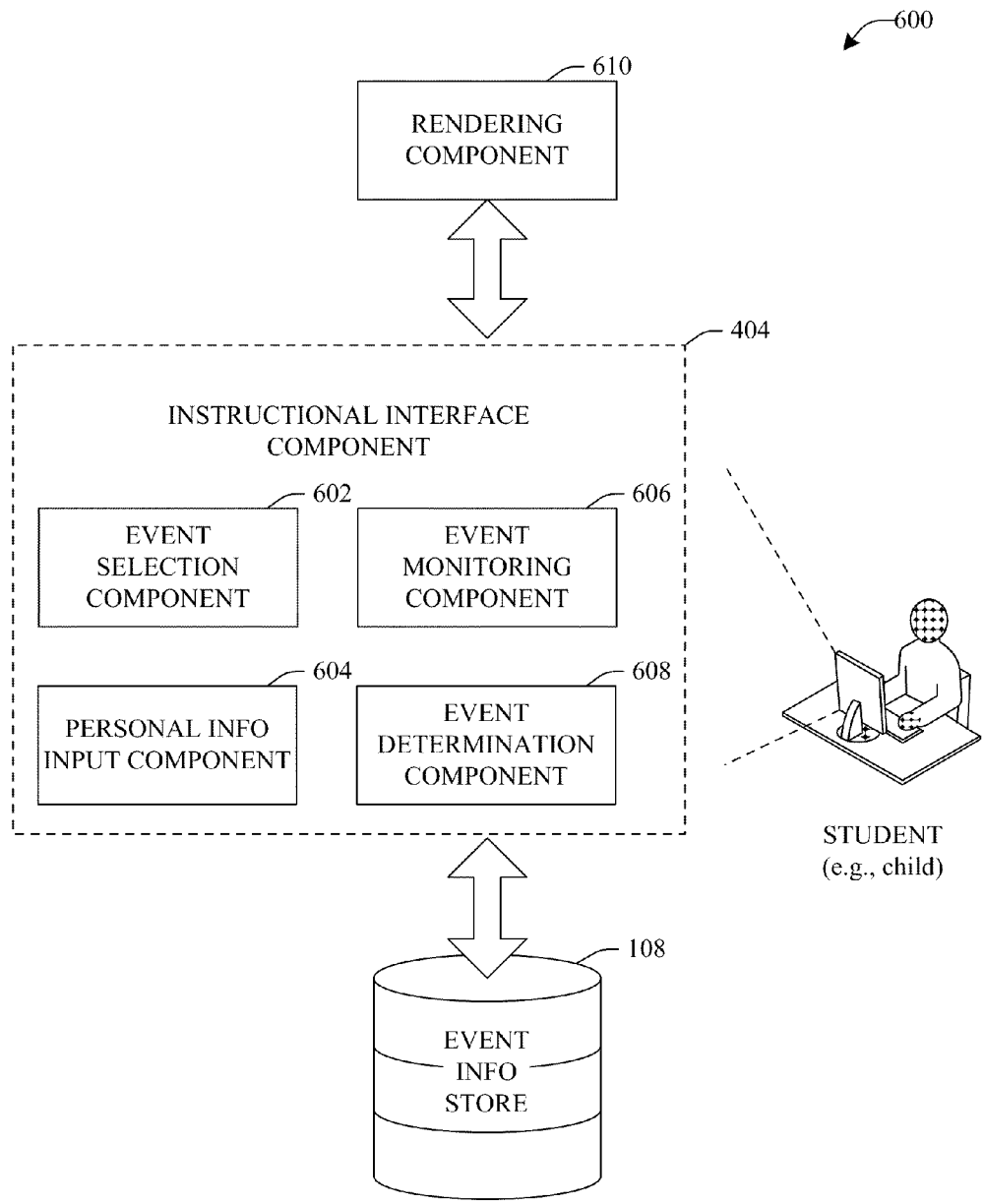
FIG. 6 illustrates an example instructional interface component in accordance with an aspect of the innovation.

FIG. 6 illustrates an example system 600 in accordance with an aspect of the innovation. As shown, system 600 can include an instructional interface component 404 which can be employed by a user or student (e.g., child) to learn and/or manage time. The instructional interface component 404 can include an event selection component 602, a personal information input component 604, an event monitoring component 606 and an event determination component 608.

The event selection component 602 enables a student to select events from a set of pre-programmed events (e.g., via a parent, system design or event information store 108). In other aspects, the student can select and/or create events based upon their own preference. Similarly, the personal information input component 604 enables a student to enter personal information such as, but not limited to, name, message, event titles, etc.

Once events are selected and associated to a particular time(s) (or time slots), the event monitoring component 606 can be employed to monitor time in relation to specific events. The event determination component 608, together with information received from the event monitoring component 606 and maintained within the event information store component 108, can acknowledge determination of a particular event and thereafter, if appropriate, render a message, alert or other notification as desired.

Figure 7:
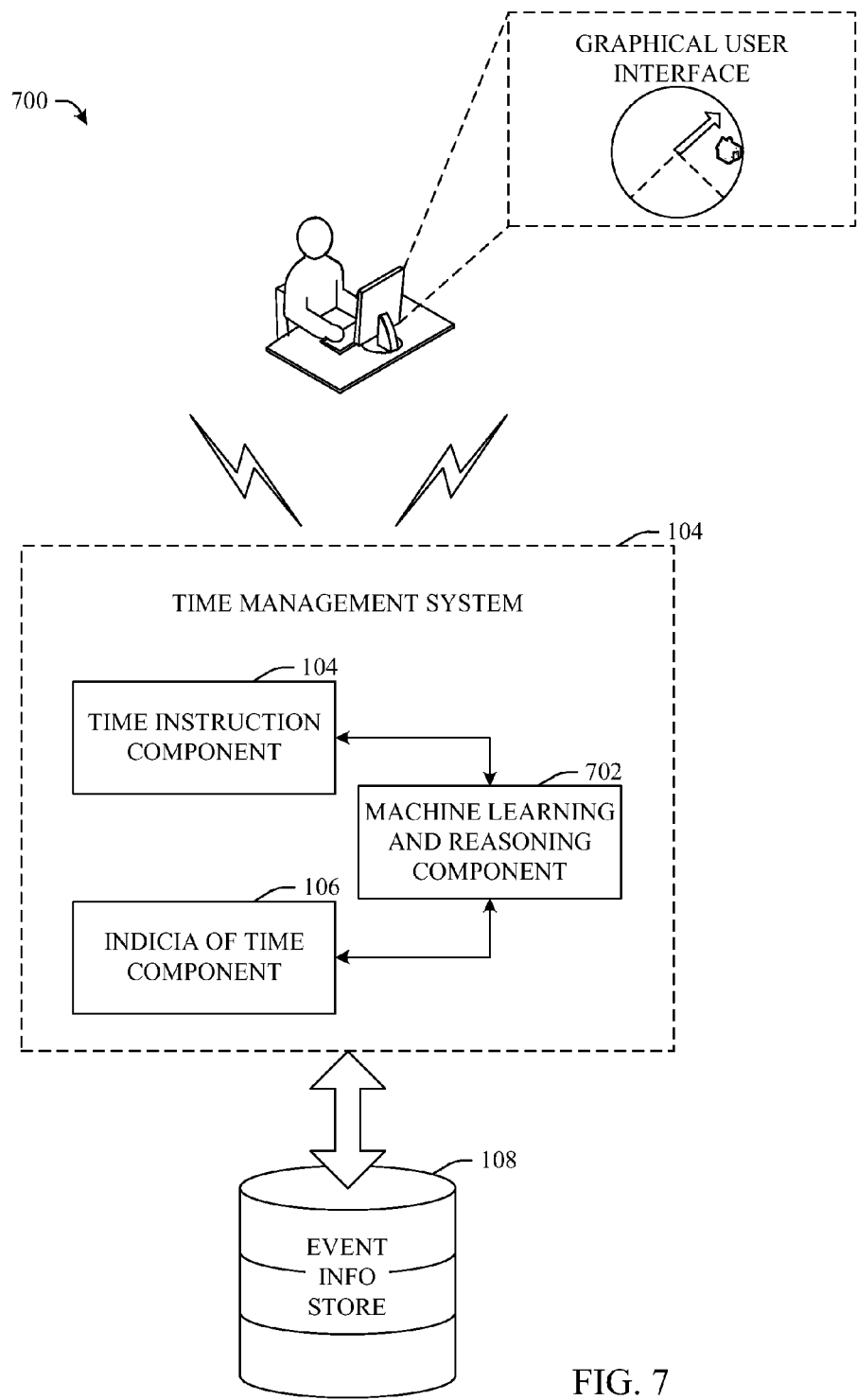
FIG. 7 illustrates an architecture including machine learning and reasoning, MLR-based component that can automate functionality in accordance with an aspect of the innovation.

FIG. 7 illustrates a system 700 that employs a machine learning and reasoning (MLR) component 702 which facilitates automating one or more features in accordance with the subject innovation. The subject innovation (e.g., in connection with event selection, programming or designation, message/alert selection, etc.) can employ a variety of MLR-based schemes for carrying out various aspects thereof. For example, a process for determining which types of events should be designated and at what time to trigger notification of the event can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, neural networks, fuzzy logic models, and probabilistic classification models providing different patterns of independence that can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions in accordance with the innovation.

Figure 8:
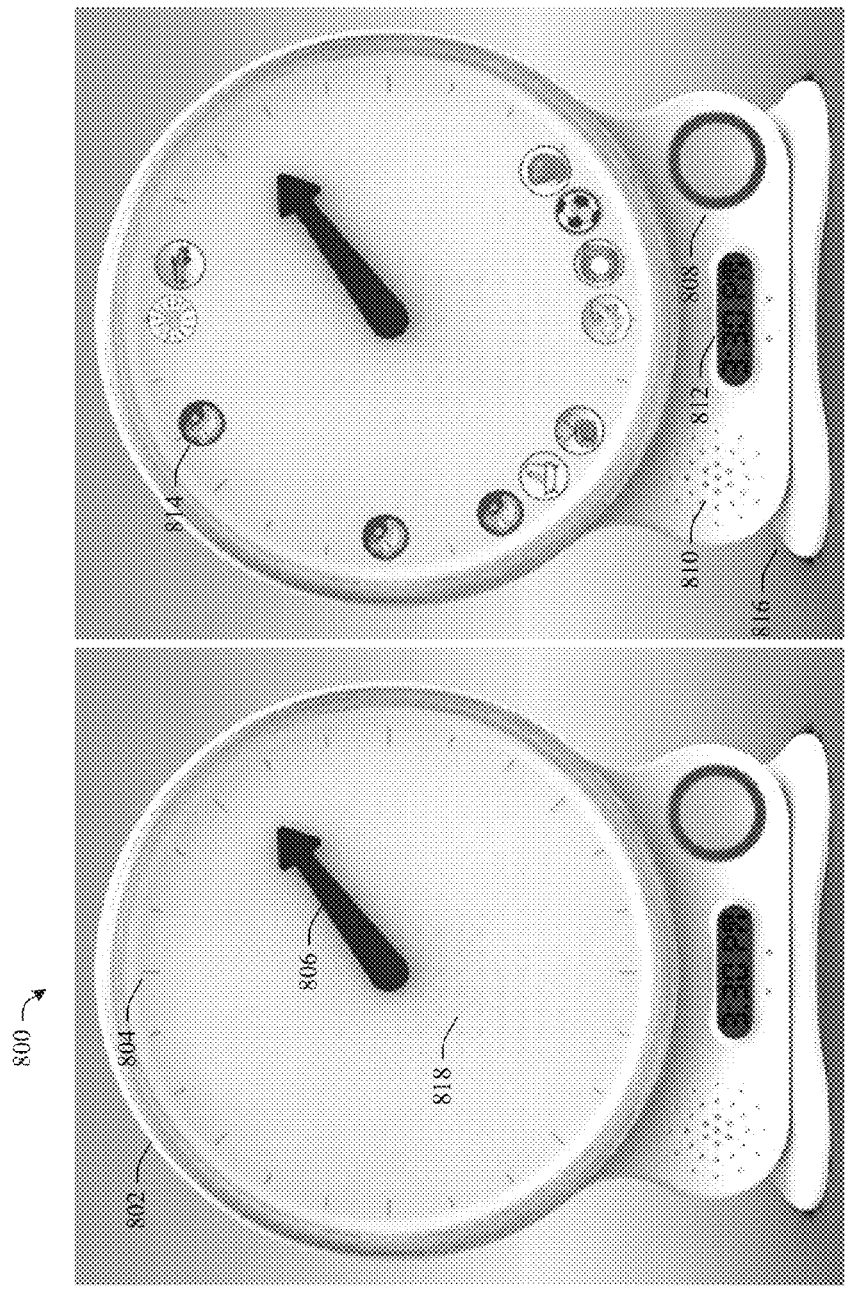
FIG. 8 illustrates an example apparatus in accordance with aspects of the innovation.

With reference now to FIGS. 8 to 13, various embodiments of an apparatus in accordance with the innovation are shown. As illustrated in FIG. 8, the apparatus 800 can include a housing 802, a time functionality module and circuitry (internal to the housing), a dial or face (e.g., having 24 marks that each represent a single hour of a calendar day), a single hand dial 806, an input/output mechanism 808, an audio (and/or visual display (not shown)) 810, 812, one or more appliqués (or graphical indicia) 814, a support base 816 integrally formed with or separate from the housing, and/or a lens 818.

As described herein, the time functionality innovation can be configured from most any hardware, software or combination thereof configured to provide time and/or time management functions. As used herein, 'time instruction' and/or 'time management' functions can include, but are not limited to, the following functions (either in combination with one or more other functions or in isolation): causing movement of the single dial (or movement of a display of, or illumination in the form of, an image indicative of time on the cover of the apparatus); providing a visual or audio display of time; providing audio recording from sources external to or generated within the device; providing playback of recorded audio; playing pre-recorded audio; and/or playing audio (and/or video) with which the device is configured at the time of manufacture, prior to the time of purchase or after the time of purchase.

The audio received and/or output from the device 800 may be indicative of most any information related to time or time management function, including, but not limited to, the past, current or future time; tasks to be performed; an amount of elapsed time; messages regarding managing time; and/or messages regarding a typical time period for performing a selected task. In other embodiments, the audio can be unrelated to time and can be, for example, motivational, a greeting or otherwise. Still further, audio (and/or video) can be programmed at a predefined time that coincides with, precedes or follows a designated event time.

Referring again to the structure of the apparatus 800, the housing 802 can be a two-piece housing, e.g., rear portion coupled to a cover. The lens 818 can be fixedly, removably or hingedly attached to encase the face 804 of the apparatus. The housing 802 can be disposed to receive the time functionality module (not shown) therein. It will be understood that the time functionality module can be representative of the time management system 100 illustrated in FIG. 1, or portion thereof. The housing 802 can be composed of most any substantially and suitably rigid material able to retain the lens 818. In one embodiment, the housing 802 is constructed of a substantially rigid material that has rounded edges and/or is substantially child-proof, e.g., injected plastic or the like.

The lens 818 may be permanently affixed or removable, as designed. In some embodiments, the lens may be hingedly fixed to the cover and/or housing 802. In an attempt to increase user (especially child) safety, removal of the lens 818 can be performed upon depressing the lens 818 thereby applying pressure onto the lens 818, and rotating the lens 818 in a clockwise or counterclockwise direction approximately 10 or more degrees. In other embodiments, the lens 818 can be rotated any number of degrees for causing a ridge on the housing 802 or cover to be released from a groove of the lens 818 that may be provided in the ridge. In other embodiments, other methods (child-proof or otherwise) for removing the lens 818 may be provided without departing from the spirit and/or scope of the innovation. Still further, embodiments are contemplated that do not employ a lens by design—these embodiments are included within the scope of this specification.

Additionally, most any method for temporarily (or permanently) affixing the lens 818 to the cover can be provided. Further, in some embodiments, the lens 818 can be formed such that it covers only a portion of the cover of the housing 802; and/or includes apertures positioned through the surface of the lens 818 for allowing a source external to the apparatus 100 to provide an input to the apparatus. By way of example, but not limitation, input can be provided through an aperture providing access to a depressible button, a slidable rod, a touch-sensitive switch or the like.

The cover of the housing can include, or otherwise embody, a face 804 that is configured to provide connection of the single hand dial 806, which can rotate 360 degrees during the course of a 12 hour period, 24 hour period or other period of time. The example of FIG. 8 is designed with 24 individual hour indicators upon the face 804 such that a single rotation of the hand dial 806 reflects a 24 hour day. The period of time over which the single hand dial 806 rotates over 360 degrees can be configurable prior to or after the time of purchase in some embodiments.

In some embodiments, wherein no single hand dial 806 is provided, the face 804 may be configured to display indicia for providing time or time management instruction. In various embodiments, the indicia can be visual, audio or otherwise. In one embodiment, the indicia can include a lighted single hand dial (or other lighted shape) configured to provide illumination in the surface of the face. Illumination apparatus, including, but not limited to, light emitting diodes ('LEDs') can be used for, and provided in, the housing and/or positioned relative to the cover, for providing such illumination of the cover.

Input and/or output mechanisms such as audio playback, audio recording, visual display, touch sensitive, rotatable, movable or depressible mechanisms for performing most any function related to recording or playing audio or providing a visual display and/or controlling the apparatus (including, but not limited to time and time management functions) can be provided.

Figure 9:
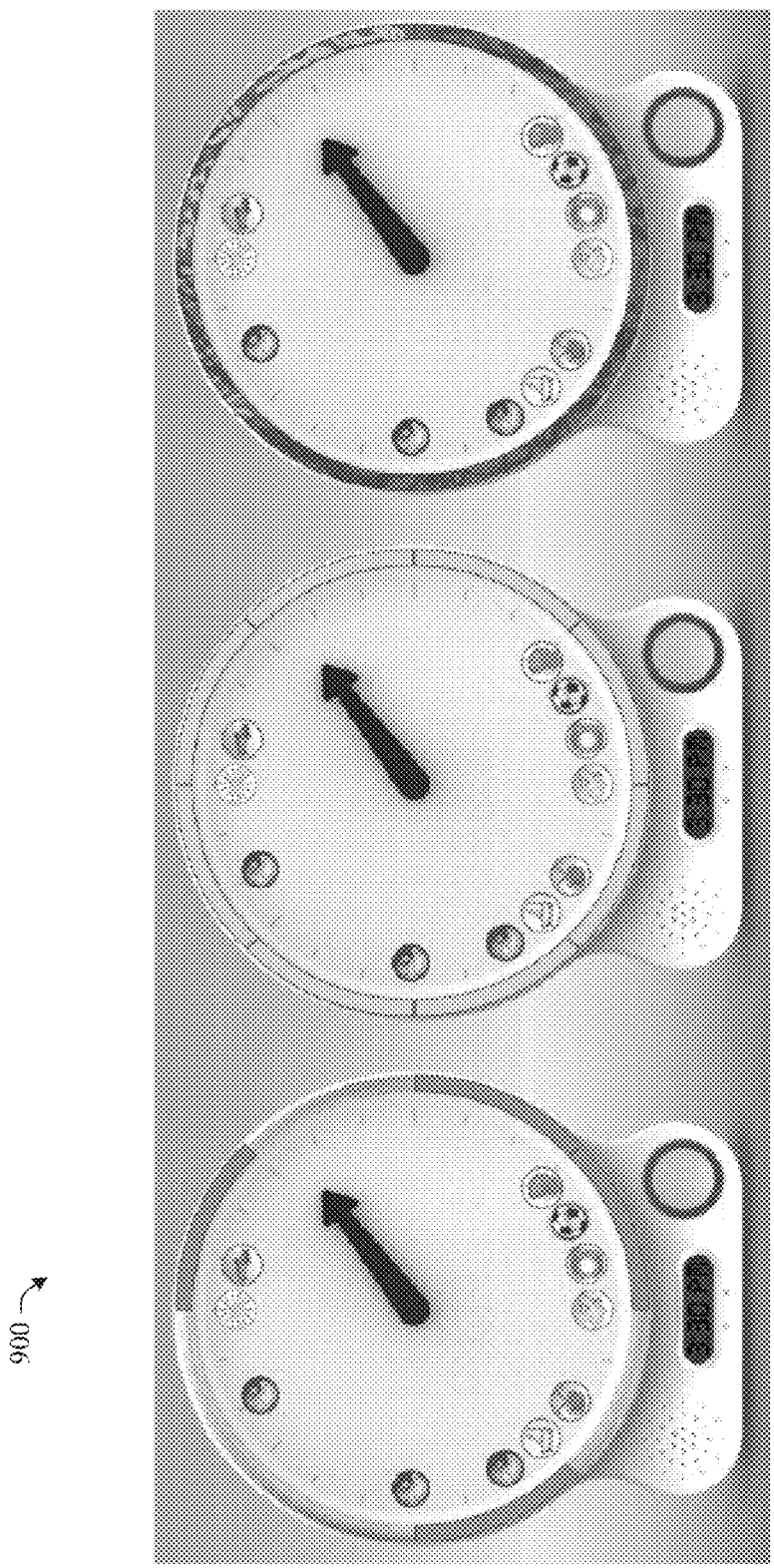
FIG. 9 illustrates example border appliqués in accordance with aspects of the innovation.

Further, pictorial or alphanumeric appliqués 814 related to time and/or time management functions, reminders or warnings of the same, can be included permanently on most any surface of the apparatus (e.g., face 804), or as part of a kit including the apparatus 800. As such, the appliqués 814 can be moved, removed, added and re-applied. The appliqués 814 may be of any texture, form or shape, including but not limited to, those in the shape of a border for application around the periphery of the lens, or those of a small size (e.g., less than ¼ or ⅛ of the size of the lens or otherwise). Examples 900 of border appliqués are shown in FIG. 9.

As described in detail supra, in various embodiments, computer program products having computer-readable mediums comprising code can be executed by a processor to perform the methods and functionality described herein. These computer program products can be stand-alone products (e.g., graphical renderings) or incorporated within the tangible apparatus (e.g., 800 of FIG. 8) as desired or appropriate.

It is to be understood that the specific configurations, orientations, scale (e.g., measurements) of the apparatus described herein) are disclosed as mere examples. Based upon design preferences, it is understood that the components and/or processes can be rearranged, substituted and/or replaced for components or processes similar in structure and/or function while remaining within the scope of the subject disclosure.

Those of skill would further appreciate that the various illustrative components and functions described in connection with the embodiments disclosed herein can be implemented as hardware, electronic hardware, computer software, or combinations of both. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the subject disclosure.

The various illustrative modules and components described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The acts of the processes described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Figure 10:
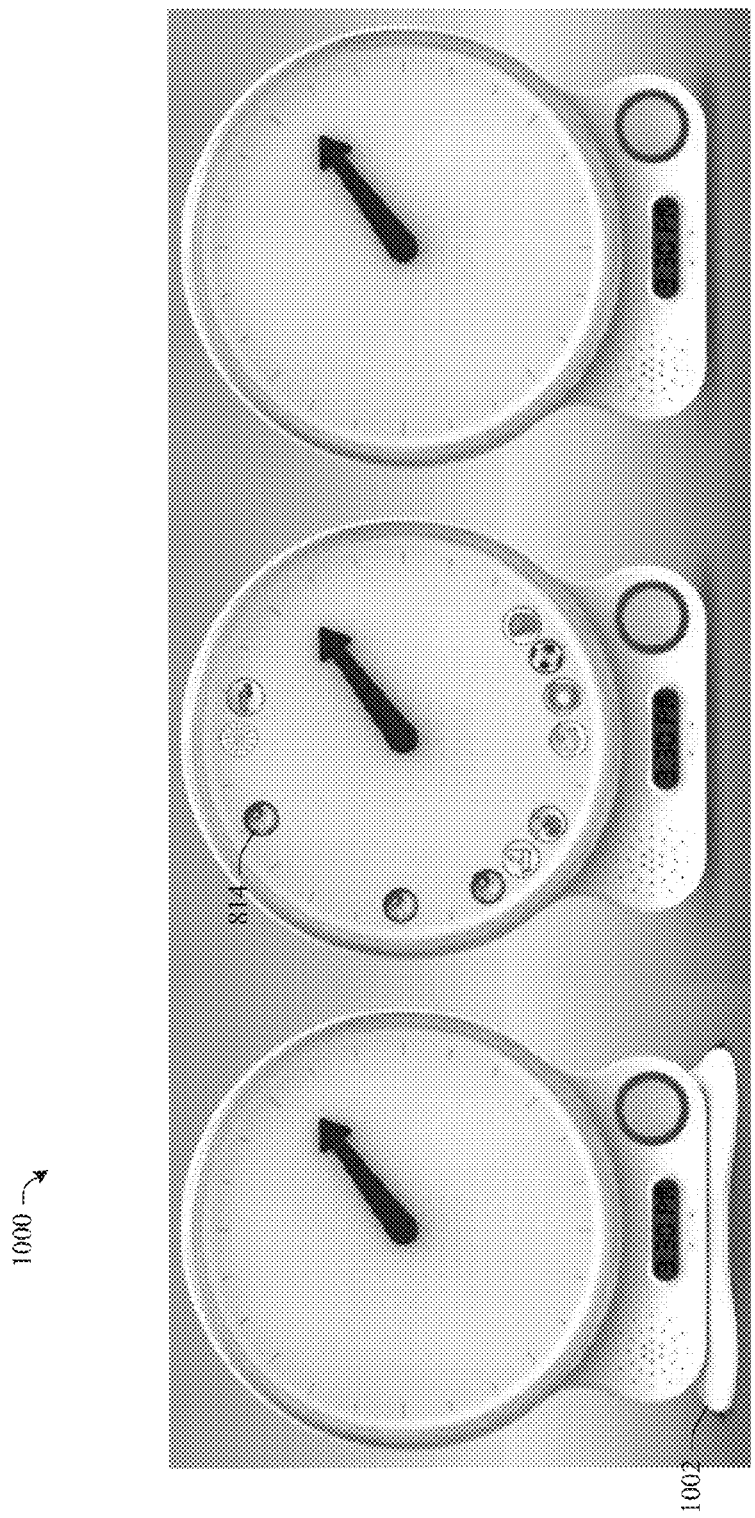
FIG. 10 illustrates an example apparatus having personalized event appliqués in accordance with aspects of the innovation.

FIG. 10 is illustrative of an apparatus 1000 that can be customized by adding event appliqués 814. In other words, the image on the left is representative of an apparatus upon purchase. Thereafter, as illustrated by the center image, event appliqués 814 can be added to designated event times upon the face of the apparatus. The image on the right is illustrative of the feature whereby the appliqués 814 can be removed returning the face to a clean surface. It will be appreciated that this feature enables the device to be used by multiple users as well as to be adaptable based upon changing events throughout a week, month or year (e.g., school year versus summer vacation).

With continued reference to FIG. 10, a removable base portion 1002 can be removably attached to the bottom of the housing as shown. In examples, the base portion 1002 can be snapped or frictionally attached to the base of the housing. In other examples, screws, two-sided tape or other suitable fasteners can be employed to attach the base portion 1002 to the housing. It will be appreciated that the removable functionality of base portion 1002 enables the device 1000 to be free standing (e.g., with the base) or hung on a wall or other surface (e.g., without the base).

Figure 11:
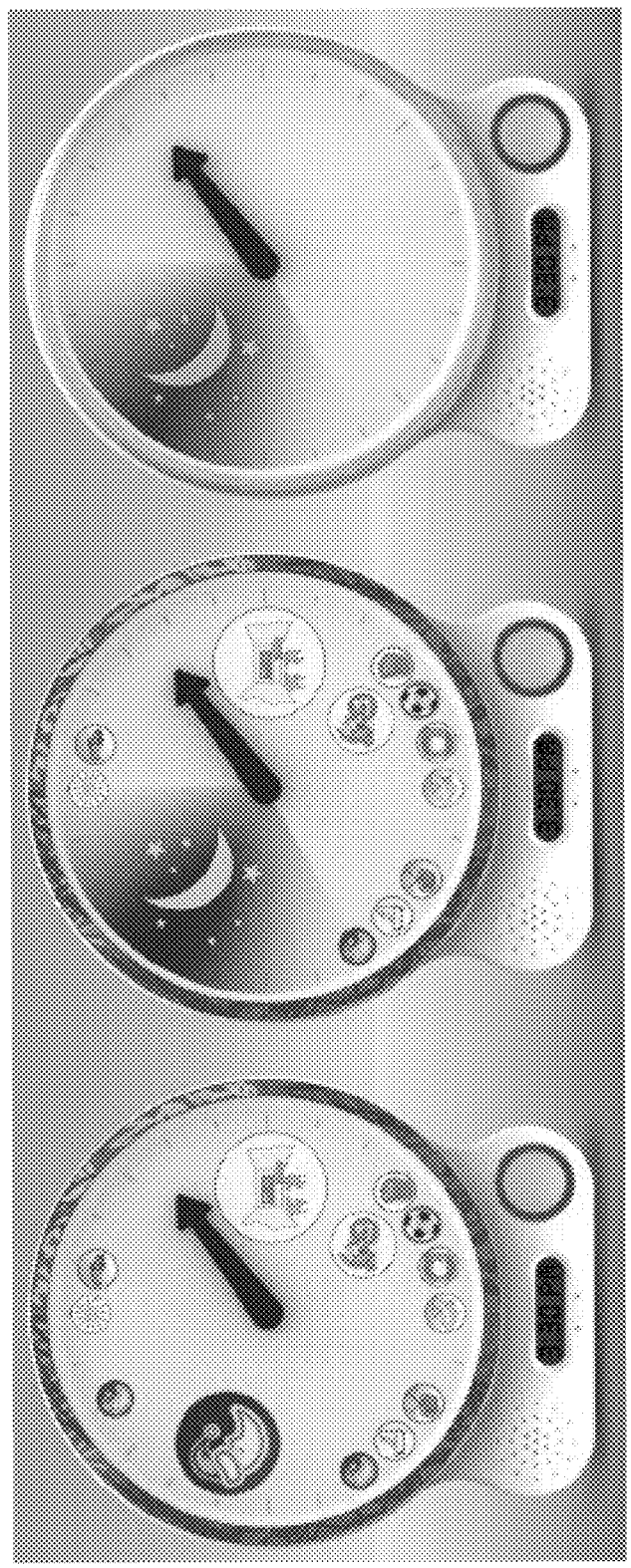
FIG. 11 illustrates additional example appliqués in accordance with aspects of the innovation.

FIG. 11 is illustrative of yet more example appliqués in accordance with aspects of the innovation. For example, nighttime or bedtime is represented by an appliqué having a moon and stars. It will be understood that the number and design of appliqués are endless—thus, any designed or designable appliqué is to be included within the scope of the innovation described herein.

Figure 12:
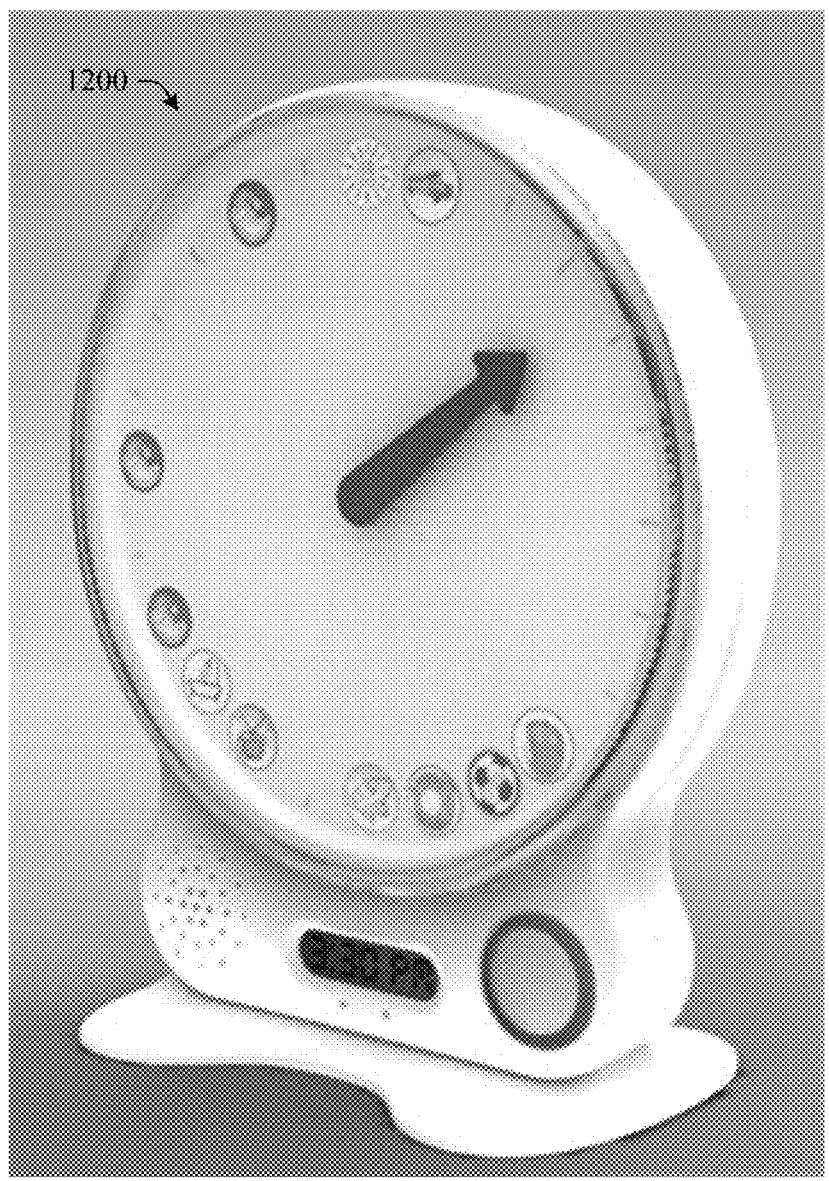
FIG. 12 illustrates a front perspective view of an apparatus in accordance with aspects of the innovation.

FIG. 12 illustrates a front perspective view of an apparatus 1200 in accordance with aspects of the innovation. As shown, the apparatus 1200 is equipped with a base portion thereby configured for table-top self-standing use.

Figure 13:
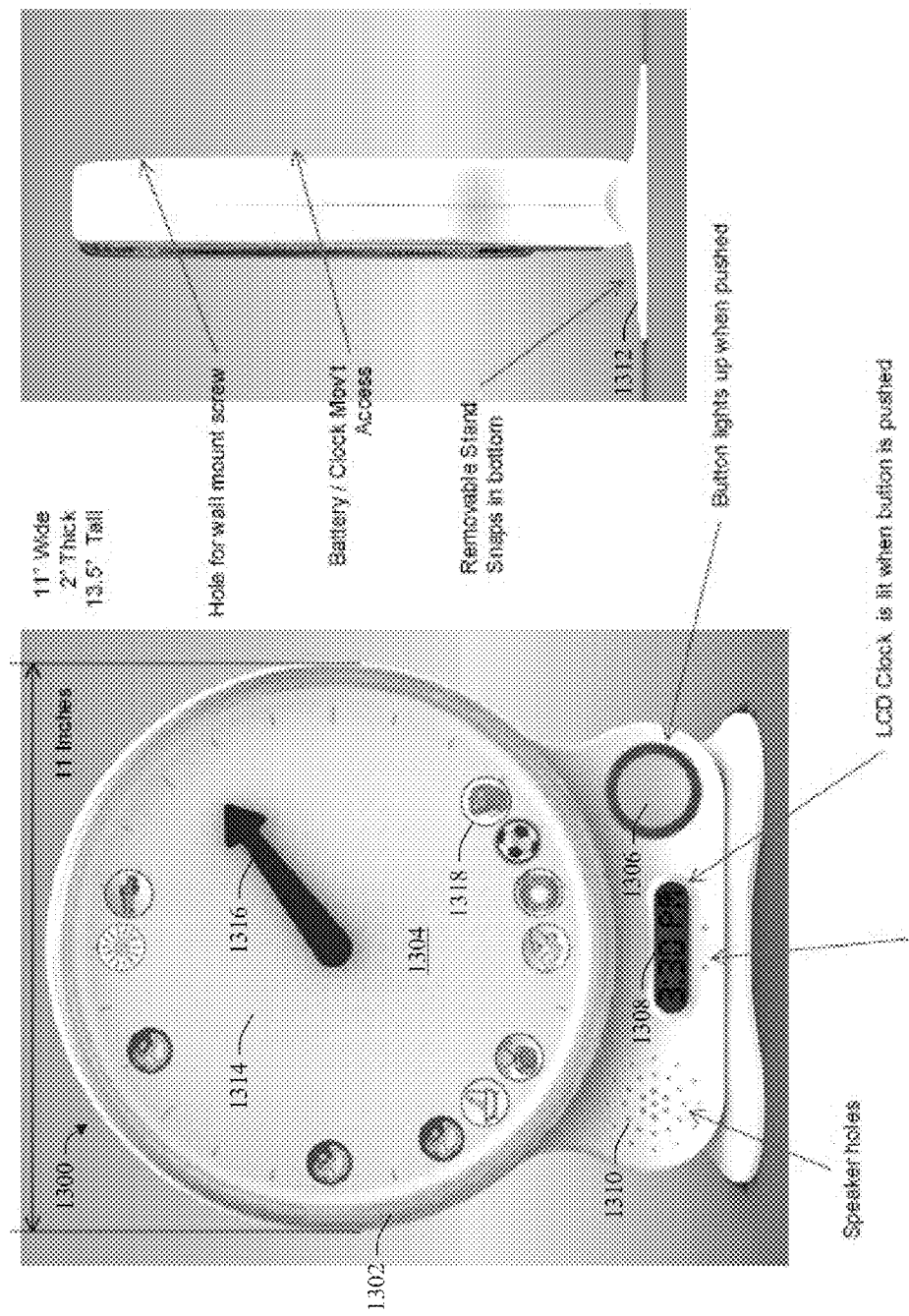
FIG. 13 illustrates an alternative example apparatus in accordance with aspects of the innovation.

FIG. 13 illustrates yet another example apparatus 1300 of the innovation. As stated earlier, the specific measurements, configurations, orientations and/or layout of the apparatus 1200 are not intended to limit the scope of the innovation's features, functions and benefits. Rather, the images and descriptions are provided merely to add perspective to the innovation—it is to be understood that unlimited alternative designs can be constructed, all of which are to be included within the scope of this specification. Additionally, it is to be understood that the innovation can be powered by batteries (DC (direct current) power), wall outlets (AC (alternating current) power), spring mechanisms (e.g., wound) or self-wound. Still other aspects do not include an auto-moving clock or time mechanism and are merely provided to assist in instruction and/or management of time by physically moving a hand dial about a clock-like face.

As described above and shown in FIG. 13, the features, functions and benefits of the apparatus 1300 can teach young children (or others) the concept of time and time management before, during and/or after learning how to read time on a regular or digital clock or watch. The device 1300 can also be used by anyone, including those that have problems understanding regular time and/or the concept of time, such as people with learning disabilities or any adult that is unable to relate to time.

In one embodiment, the device 1300 can include a plastic housing 1302 manufactured from material suitable for young children, although it can be made of most any other suitably rigid material such as metals, woods or the like. A front view of the housing 1302 depicts a round face 1304 (typical of a wall clock) of approximately 9 to 10 inches of diameter and built in attachment, similar to a box, displaying a large button 1306, an LCD (liquid crystal diode) clock 1308 and opening holes 1310 to allow sound to come through from a speaker (not shown) that is located in the housing 1302. Nonetheless, the design of the built-in box may vary such as placing the button 1306 in the middle, speaker 1310 in either side of the face 1304 or LCD 1308 location in the box, face of the clock or most any other portion thereof. In addition, the housing 1302 design is not limited to wall (or stand-up) clocks; it may also include wrist watches, pocket watches or any other device that displays the passage of time in an analog or digital manner.

As described above, the housing 1302 can be designed to be mounted on a wall through a small opening on the back of the clock or can be snapped into a base portion 1312 and be placed on top of a counter-type or horizontal surface. An additional base might be included integrally formed with or as a separate component of the housing (e.g., a built in stand that extends from the back of the housing, similar to picture frames).

The apparatus can contain a clear (e.g., plastic or glass) lens 1314 that can be removed or otherwise opened (e.g., hinged). For example, the lens 1314 can be removed by parents or any other guardians in order to access the face 1304 of the clock 1300. In one embodiment, as described supra, the device 1300 is designed such that the lens 1314 can be removed by applying pressure in the direction of the lens 1314 and turning the lens 1314 any suitable number of degrees for releasing the lens 1314 according to the design of the lens 1314 in connection with the housing 1302.

By way of example, but not limitation, the lens 1314 can be removed by turning the lens 1314 approximately 10 or more degrees to the right or the left of the original position in which the lens 1314 rests in the housing 1304. The removable lens 1314 can be detached completely from the housing 1302 of the device 1300 or be opened in the form of a small gate or door. In one embodiment, the lens 1314 can be moved away from the housing 1302 in a hinged-like manner to open in a manner similar to that of a hinged gate. Either design can increase the safety aspect of the device 1300 as the design can be more child proof by reducing the chances that small children (or others) can access the face 1304, or hand dial 1316, of the device 1300. Correspondingly, the clock hand dial 1316 can be sealed from unattended access, e.g., without adult supervision.

The clock mechanism (not shown, e.g., within the housing 1302) can employ a quartz movement or similar that will rotate the hand dial 1316 once in every 24 hour period, although a different version of the innovation can employ a mechanism that rotates once every 12 hours. In examples, these 12 hour rotational aspects can be employed by people and institutions that might need to convey the concept of time and time management for periods that do not exceed 12 hours, e.g., a daycare that can use the device from 6 a.m. in the morning to 6 p.m. in the evening.

Turning to a discussion of the hand dial 1316, the device 1300 can employ a single hand dial 1316, as opposed to the conventional clocks, which include two hand dials, one for hours and one for minutes. The single hand dial 1316 can be rotatably positioned upon the face 1304 of the device 1300 or it might be interchangeable by the consumer to create a customized look, as desired. In addition, the physical hand 1316 can be replaced in a different version of the device 1300 by lighting a section on the face 1304 of the device 1300 that designates the time and the activity to be performed by the child or any other user.

With continued reference to the example device 1300 of FIG. 13, the device 1300 can display actual time in a digital LCD format located in the center of the built-in box in the casing area (1308). However, the LCD clock 1308 can be placed in most any area of the housing 1302, such as other places in the built-in box, the actual face 1304 of the device 1302 or most any other place in or around the device 1300. The LCD screen 1308 can light up, or not (e.g., remain unlit) if desired, when the user presses a button (e.g., 1306) located in the housing area.

The device 1300 can display a large button 1306, although it can be of most any size, in the front (or any other surface) of the attached box in the housing device. The button 1306 can be child-proof and it can light when depressed. The location, configuration or orientation of the button 1306 might vary in size, shape or location depending on product design or generation.

As discussed above, the device 1300 can have built-in recording and playback components and functionality. The recording component allows users to play one or more pre-recorded messages to end user (e.g., a user of the device). Messages might include a greeting or most any other type of messages to the intended user. In addition, the playback message might allow parents to incorporate a short recording embedded in the overall message, such as the child name or any other message.

Also, the recording and playback components (e.g., integral to the housing 1302) can allow users to record one or several personalized greetings that will allow parents of children or guardians to record a completely personalized message. These messages, whether personalized or pre-recorded, can be played back by an end user by pressing the button 1306, described above. A different version of the product can have the ability to record up to 24 personalized messages to describe each of the events or activities to be performed in any 24 hour period.

Messages can be played in a rotational format (e.g., in a continuous stream of multiple messages) or individually, based on an end user decision or determination basis by placing a playback switch in one of three positions (pre-recording playback, personalize payback or rotational mode). In other aspects, the messages can be played back corresponding to a time associated with a designated event, or events.

Different events or tasks that the child or other end user have to perform throughout the day can be displayed by descriptive stickers or appliqué 1318 that can be designed to be placed on the face of the time management device 1300. In various embodiments, however, the appliqué 1318 can be placed on most any surface of the device 1300. The appliqué 1318 can be made with child-proof material and can visually describe or identify events/activities to be performed by children or end-users during a time period, such as any 24 or 12 hours time period. Thus, the child need not know how to read text. Additional blank stickers or appliqué can be provided with the device in order to allow parents and children to personalize events, as desired. The visual representations, appliqué or stickers 1318 can be made of most any suitable material and applied to the face 1304 of the device 1300 in any suitable manner (e.g., adhesively, magnetically or through electronic display in the way of LCD animation/pictures or other electronic technology). The add-on visual representations 1318 of daily events/activities can be stuck, attached, and/or displayed in any manner. It will be appreciated that the event representations 1318 can be placed on most any part of device in order to personalize product by end user.

In aspects, an alarm, alert or notification can be added or employed by the device 1300 to alert parents and end users that the time to perform one or more specific activity is approaching, has arrived or passed. The alarm can be set according to traditional alarms that are set in conventional analog or digital clocks. In addition to conventional time-based alarm, the innovation can be programmed so as to render a user-specified (or programmed) alarm that corresponds to a particular activity. For example, when the soccer ball time is reached in FIG. 13, an alarm can sound that renders a parent's voice, e.g., to tell Mason it is time for soccer practice. As will be understood, the examples are countless, all of which are to be included within the scope of this innovation and claims appended hereto.

While the illustrated embodiments employ specific orientations and configurations, it is to be understood that alternative aspects can be designed and employed without departing from the features, functions and benefits described herein.

For example, alternative embodiments can employ an all-digital display, two-handed display, as well as other components. Additionally, aspects can be designed of different shapes, measurements, orientations and/or configurations without departing from the scope of this specification.

Figure 14:
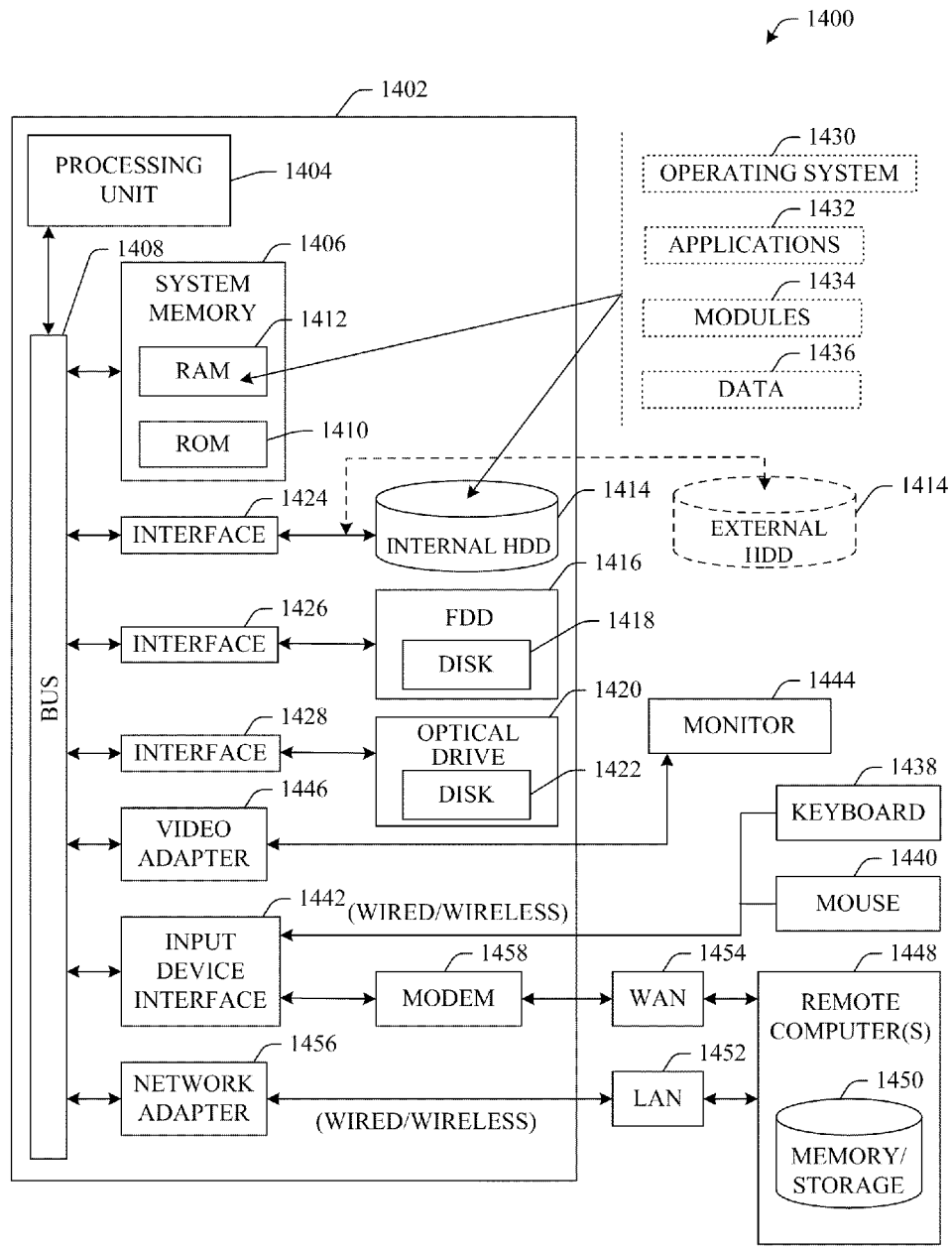
FIG. 14 illustrates a block diagram of a computer operable to execute the disclosed architecture.

Referring now to FIG. 14, there is illustrated a block diagram of a computer operable to execute the disclosed architecture. In order to provide additional context for various aspects of the subject innovation, FIG. 14 and the following discussion are intended to provide a brief, general description of a suitable computing environment 1400 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects of the innovation includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further be interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to an HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the innovation can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
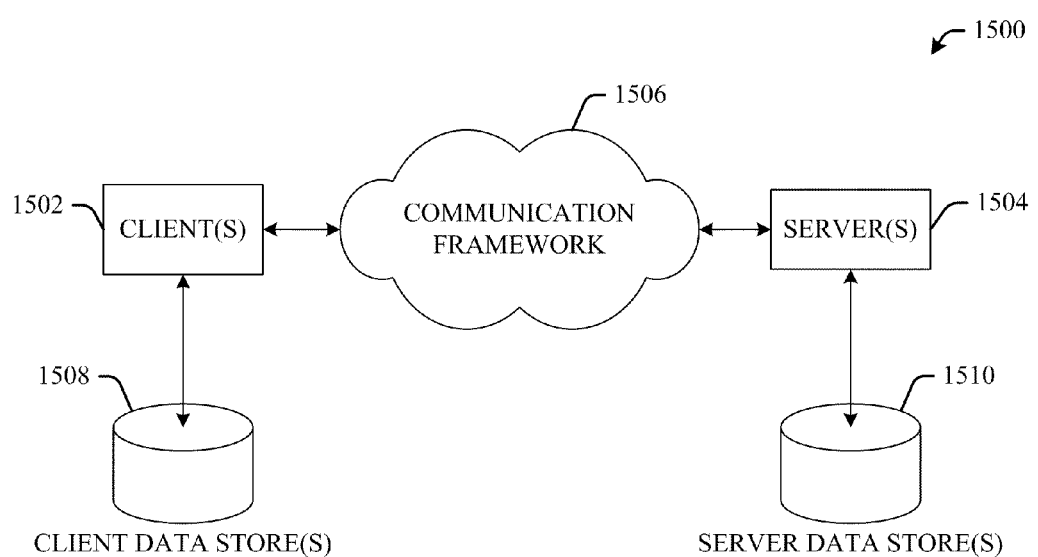
FIG. 15 illustrates a schematic block diagram of an exemplary computing environment in accordance with the subject innovation.

Referring now to FIG. 15, there is illustrated a schematic block diagram of an exemplary computing environment 1500 in accordance with the subject innovation. The system 1500 includes one or more client(s) 1502. The client(s) 1502 can be hardware and/or software (e.g., threads, processes, computing devices). The client(s) 1502 can house cookie(s) and/or associated contextual information by employing the innovation, for example.

The system 1500 also includes one or more server(s) 1504. The server(s) 1504 can also be hardware and/or software (e.g., threads, processes, computing devices). The servers 1504 can house threads to perform transformations by employing the innovation, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates time management, comprising:
   a time instruction component that records a plurality of event indicators, wherein each of the event indicators is an audio recording associated with a time;
   an indicia of time component that employs a single hand dial that identifies the time in relation to a graphical representation of at least one of the plurality of event indicators associated to the time, wherein a single rotation of the single hand dial corresponds to twenty-four hours, wherein the indicia of time component comprises a digital display that identifies the time;
   a housing that comprises at least one input device for interacting with the time instruction component, wherein the time instruction component and the indicia of time component are maintained within the housing;
   a stand removably coupled to a bottom portion of the housing; and a lens removably and rotatably secured to the housing that covers the time instruction component and the indicia of time component, wherein a ridge of the housing and a groove of the lens facilitate removal of the lens from the housing.

2. The system of claim 1, further comprising a personal information input component that facilitates input of personal information, wherein the personal information is rendered upon trigger by a user or upon the time.

3. The system of claim 2, wherein the personal information is one of a name or personal message.

4. The system of claim 1, further comprising machine learning and reasoning (MLR) component that employs at least one of a probabilistic and a statistical-based analysis that infers an action that a user desires to be automatically performed.

5. The system of claim 1, further comprising a programming interface component that facilitates input and identification of the plurality of event indicators.

6. The system of claim 5, further comprising an event input component that receives each of the plurality of event indicators from a user.

7. The system of claim 5, further comprising an instructional interface component that facilitates selection of a subset of the plurality of event indicators and association of each of the subset to an associated time.

8. The system of claim 7, further comprising an event selection component that presents each of the plurality of event indicators for selection.

9. The system of claim 8, further comprising a personal information input component that facilitates input of personal information, wherein the personal information is rendered upon trigger of a user or upon the time.

10. The system of claim 9, further comprising an event monitoring component that tracks each of the subset of the plurality of event indicators in relation to the time.

11. The system of claim 10, further comprising an event determination component that compares the time to each of the subset of the plurality of event indicators and identifies an event that corresponds to the time.

12. The system of claim 11, further comprising a rendering component that displays a single dial that identifies a current time in relation to the event that corresponds to the current time.

\* \* \* \* \*